United States Patent
Rui et al.

(10) Patent No.: US 10,341,857 B2
(45) Date of Patent: *Jul. 2, 2019

(54) PRIVACY PRESERVING SENSOR APPARATUS

(71) Applicant: Microsoft Technology Licensing, LLC, Redmond, WA (US)

(72) Inventors: Yong Rui, Beijing (CN); Daniel Morris, Bellevue, WA (US); Andrew D. Wilson, Seattle, WA (US); Nikunj Raghuvanshi, Redmond, WA (US); Desney S. Tan, Kirkland, WA (US); Jeannette M. Wing, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,137

(22) Filed: Jan. 24, 2018

(65) Prior Publication Data

US 2018/0220297 A1 Aug. 2, 2018

Related U.S. Application Data

(63) Continuation of application No. 14/158,800, filed on Jan. 18, 2014, now Pat. No. 10,057,764.

(51) Int. Cl.
*H04W 12/02* (2009.01)
*G06F 21/62* (2013.01)
*G06F 21/83* (2013.01)

(52) U.S. Cl.
CPC ........ *H04W 12/02* (2013.01); *G06F 21/6245* (2013.01); *G06F 21/83* (2013.01); *G06F 2221/031* (2013.01)

(58) Field of Classification Search
CPC .... H04W 12/02; G06F 21/83; G06F 21/6245; G06F 2221/031
See application file for complete search history.

(56) References Cited

U.S. PATENT DOCUMENTS 6,067,399 A 5/2000 Berger
7,362,355 B1 4/2008 Yang et al.
(Continued)

FOREIGN PATENT DOCUMENTS

EP 2157781 A1 2/2010
WO 2013040485 A2 3/2013

OTHER PUBLICATIONS

Yonezawa, et al., "Privacy Protected Life-context-aware Alert by Simplified Sound Spectrogram from Microphone Sensor", In Proceedings of the 5th ACM International Workshop on Context-Awareness for Self-Managing Systems, Sep. 18, 2011, 6 pages.
(Continued)

*Primary Examiner* — Meng Li
(74) *Attorney, Agent, or Firm* — Medley, Behrens & Lewis, LLC (57) ABSTRACT

A privacy preserving sensor apparatus is described herein. The privacy preserving sensor apparatus includes a microphone that is configured to output a signal that is indicative of audio in an environment. The privacy preserving sensor apparatus further includes feature extraction circuitry integrated in the apparatus with the microphone, the feature extraction circuitry configured to extract features from the signal output by the microphone that are usable to detect occurrence of an event in the environment, wherein the signal output by the microphone is unable to be reconstructed based solely upon the features.

19 Claims, 7 Drawing Sheets

(56) References Cited

U.S. PATENT DOCUMENTS

| | | | |
|---|---|---|---|
| 9,318,086 B1* | 4/2016 | Miller | G10H 1/02 |
| 2004/0137878 A1* | 7/2004 | Oyama | H04N 5/44582 |
| | | | 455/411 |
| 2006/0134904 A1* | 6/2006 | Araki | B81C 1/00246 |
| | | | 438/618 |
| 2006/0198520 A1* | 9/2006 | Courtney | H04L 1/0056 |
| | | | 380/247 |
| 2008/0215318 A1 | 9/2008 | Zhang et al. | |
| 2010/0182447 A1 | 7/2010 | Namba et al. | |
| 2011/0190008 A1 | 8/2011 | Eronen et al. | |
| 2012/0047374 A1 | 2/2012 | Klum et al. | |
| 2012/0295637 A1 | 11/2012 | Hannuksela et al. | |
| 2012/0303360 A1* | 11/2012 | Grokop | G10L 21/0208 |
| | | | 704/201 |
| 2012/0316869 A1* | 12/2012 | Xiang | H04K 1/02 |
| | | | 704/226 |
| 2014/0188473 A1 | 7/2014 | Lambdin et al. | |
| 2015/0208233 A1 | 7/2015 | Rui et al. | |
| 2016/0005394 A1 | 1/2016 | Hiroe | |

OTHER PUBLICATIONS

Schroeder, et al., "Detection and Classification of Acoustic Events for In-Home Care", In Ambient Assisted Living, Jan. 25, 2011, 15 pages.

Pleva, et al., "D7.4 Multimodal Features Analysis Component", In European Seventh Framework Programme, Jun. 30, 2011, 95 pages.

Parthasarathi, Shree Hari Krishnan, "Privacy-Sensitive Audio Features for Conversational Speech Processing", In PhD Thesis, Dec. 6, 2011, 151 pages.

Li, et al., "Acoustic Fall Detection Using a Circular Microphone Array", In 32nd Annual International Conference of the IEEE EMBS, Aug. 31, 2010, 4 pages.

Parthasarathi, et al., "Speaker Change Detection with Privacy-Preserving Audio Cues", In Proceedings of the International Conference on Multimodal Interfaces, Nov. 2, 2009, 4 pages.

Wyatt, et al., "Capturing Spontaneous Conversation and Social Dynamics: A Privacy-Sensitive Data Collection Effort", In IEEE International Conference on Acoustics, Speech and Signal Processing, vol. 4, Apr. 15, 2007, 4 pages.

Alu, et al., "Cloaking a Sensor", In Physical Review Letters, vol. 102, Issue 23, Jun. 8, 2009, 5 pages.

"Response to the Office Action for European Patent Application No. 15702868.9", dated Sep. 29, 2016, 16 Pages.

"Response to the Office Action for Chinese Patent Application No. 201580004765.5", Filed Date: Dec. 22, 2016, 15 Pages.

"International Preliminary Report on Patentability Issued in PCT Application No. PCT/US2015/011075", dated Oct. 8, 2015, 6 Pages.

"Response to the International Search Report & Written Opinion for PCT Application No. PCT/US2015/011075", Filed Date: Aug. 7, 2015, 9 Pages.

"International Search Report & Written Opinion Received for PCT Application No. PCT/US2015/011075", dated Apr. 24, 2015, 9 Pages.

"Non-Final Office Action for U.S. Appl. No. 14/158,800", dated Jun. 24, 2015, 18 pages.

"Response to the Non-Final Office Action for U.S. Appl. No. 14/158,800", Filed Date: Dec. 28, 2015, 16 pages.

"Final Office Action for U.S. Appl. No. 14/158,800", dated Mar. 2, 2016, 22 pages.

"Response to the Final Office Action for U.S. Appl. No. 14/158,800", Filed Date: Sep. 1, 2016, 13 pages.

"Non-Final Office Action for U.S. Appl. No. 14/158,800", dated Nov. 16, 2016, 13 pages.

"Response to the Non-Final Office Action for U.S. Appl. No. 14/158,800", Filed Date: May 16, 2017, 12 pages.

"Final Office Action for U.S. Appl. No. 14/158,800", dated Sep. 6, 2017, 15 pages.

* cited by examiner

PRIVACY PRESERVING SENSOR APPARATUS

RELATED APPLICATION

This application is a continuation of U.S. patent application Ser. No. 14/158,800, filed on Jan. 18, 2014, and entitled "PRIVACY PRESERVING SENSOR APPARATUS", the entirety of which is incorporated herein by reference.

BACKGROUND

Sensor devices are fast becoming ubiquitous. For example, a conventional mobile telephone can include microphones, video cameras, accelerometers, GPS sensors, etc. Some sensors that can be found in the home environment, however, may give rise to privacy concerns for users in the home environment. For example, a conventional television (and/or an accessory for a television) can be equipped with a video camera and microphone. A signal output by a video camera and/or a microphone can be processed by a processing device, and a television can present content to a viewer based upon the processing of such signal. For instance, the viewer can audibly emit the statement "show me movies starring Humphrey Bogart," and the television can present a list of selectable tiles, wherein each tile represents a respective movie starring the aforementioned actor. Likewise, a signal output by the video camera can indicate that the viewer performed a particular gesture, and content can be presented to the viewer based upon the gesture being recognized. For instance, a flick of a wrist can cause a channel to be changed, can cause a volume of audio output by the television and/or associated audio system to be altered, etc.

Generally, when a device that includes a sensor is on, the sensor itself is on and generating data that is indicative of a state of the surroundings of the sensor. Referring to the exemplary scenario noted above, a microphone of a television can capture audio while the television is on, often unbeknownst to a viewer. Still further, some conventional devices are configured to transmit captured signals (or features representative thereof) to a computing device used in a cloud service, wherein the computing device analyzes the signals for purposes of voice recognition, facial recognition, gesture recognition, etc., and performs an action when a word is recognized, when a face is identified, etc. The cloud service then discards the received signals.

As noted above, users may have privacy concerns when their respective actions can be captured by such sensors. For example, a malicious hacker may potentially reprogram a processor that is in communication with the sensor, thereby causing captured signals to be transmitted to a data store chosen by the malicious hacker (e.g., where the signals can be retained and reviewed unbeknownst to a person whose actions are captured in a sensor stream). Further, data transmitted from the device that includes the sensor to the computing device used in the cloud service may include sufficient information to allow words spoken by the viewer to be reconstructed, to allow the viewer to be identified, etc. This again gives rise to privacy concerns, as data can be intercepted during transmission.

SUMMARY

The following is a brief summary of subject matter that is described in greater detail herein. This summary is not intended to be limiting as to the scope of the claims.

Described herein are various technologies pertaining to a sensor apparatus that can be configured to capture signals in a home environment (home) and process such signals while preserving privacy of a person in the home. The sensor apparatus includes at least one sensor, which can be any suitable sensor that outputs data that can be used to detect a desirably detected event. Accordingly, the at least one sensor can be or include a microphone, a camera, an accelerometer, a vibration sensor, etc. The sensor is tightly coupled to feature extraction circuitry that is configured to extract features from a signal output by the sensor. For purposes of explanation, the sensor will be described as being a microphone, although aspects described herein are not intended to be limited to microphones. In an exemplary embodiment, the microphone can be integrated with the feature extraction circuitry. Therefore, for instance, the microphone can be embedded in an integrated circuit (IC) together with the feature extraction circuitry. Thus, pursuant to an example, the microphone can be an embedded micro-electrical mechanical system (MEMS) microphone that is embedded in silicon together with the feature extraction circuitry. Accordingly, the sensor apparatus is designed such that an attempt to modify the hardware (to allow the signal output by the microphone to be intercepted) results in the microphone and/or associated feature extraction circuitry being damaged such that the sensor apparatus is unable to function.

The feature extraction circuitry is configured to receive the signal output by the microphone and extract features therefrom, wherein the features can be used to detect a desirably detected event, but are unable to be used to reconstruct the signal output by the microphone. For example, the sensor apparatus can be employed to detect the event of a child is crying. It can be ascertained that features extracted from the signal output by the microphone can be indicative of whether or not the child is crying. An owner of the sensor apparatus, however, may desire that words uttered in proximity to the microphone are not analyzed for semantics (e.g., the owner of the sensor apparatus may feel that her privacy is invaded when semantics of her conversations are analyzed). The feature extraction circuitry can extract features from the signal output by the microphone that allow for detection of the desirably detected event (e.g., the child crying), while such features are unable to be used to perform semantic analysis or otherwise reconstruct the signal output by the microphone.

In another exemplary embodiment, the sensor apparatus can be configured to extract features that can be used to perform machine translation of a predefined set of words in a language of an owner of the sensor apparatus. Thus, the feature extraction circuitry can extract features from the signal output by the microphone that can be utilized by a machine translation system to detect that a person has spoken a word in the predefined set of words. The features extracted by the feature extraction circuitry, however, may not include sufficient information to allow the machine translation system to recognize words outside of the predefined set. Features of the signal not extracted by the feature extraction circuitry are immediately discarded.

The sensor apparatus may further include a wireless transceiver that can transmit features extracted from the signal (e.g., output by the microphone) to computing device utilized in a cloud service (directly or indirectly). The computing device of the cloud service can receive the features and, for example, detect occurrence of a desirably detected event based upon such features. Continuing with an example set forth above, the computing apparatus in the cloud service can identify that the child is crying. An output signal can be transmitted to a notification device, which may be in an environment in which the sensor apparatus is located. The notification device can be configured to notify a person of occurrence of the event.

In an exemplary embodiment, the feature extraction circuitry in the sensor apparatus is preconfigured and static. Accordingly, a hacker is unable to reprogram the feature extraction circuitry to extract other features from the signal output by the microphone. In another exemplary embodiment, the sensor apparatus can be configured with a plurality of predefined feature extraction modes. For instance, in a first mode, the feature extraction circuitry can be configured to extract a first set of features from a signal output by a microphone, wherein the first set of features are employable to detect semantics in a spoken utterance. In a second mode, the feature extraction circuitry can be configured to extract a second set of features from a signal output by the microphone, wherein the second set of features include information that can be used to determine an identity of a speaker. In a third mode, the feature extraction circuitry can be configured to extract a third set of features from a signal output by the microphone, wherein the third set of features include information that can be used to detect when a child is crying. The first set of features, however, may not include sufficient information to allow for detection of identity of a speaker or detection of when a child is crying. Similarly, the second set of features may not include sufficient information to allow for detection of semantics of spoken words or when a child is crying. Likewise, the third set of features may not include sufficient information to allow for detection of semantics of spoken words or detection of an identity of a speaker. Thus, the feature extraction circuitry can comprise three separate circuits, only one of which can be active at a given point in time.

Such a sensor apparatus can be particularly well-suited for a variety of different applications. In an exemplary embodiment, the sensor apparatus can be employed in connection with a television, game console, or the like. For instance, with respect to a television that supports recognition of voice commands, the sensor apparatus can be configured to extract features that can be used by a voice recognition system to identify a relatively small number of words (voice commands); however, the voice recognition system may be unable to detect other words using such features. Further, the sensor apparatus may be particularly well-suited for a home security application, wherein the sensor apparatus is configured to extract features from an audio signal that can be used to identify a window breaking, a door being broken opened, etc. The extracted features, however, may be unable to be used to reconstruct the signal output by the microphone, and may be further unable to be used to identify words in speech. The sensor apparatus may further be particularly well-suited for applications where a person may need assistance. For instance, for a person who is somewhat elderly, it may be advantageous to include such a sensor apparatus in the home to detect a fall, a cry for help, or the like, while alleviating privacy concerns of the person.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a privacy preserving sensor apparatus are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
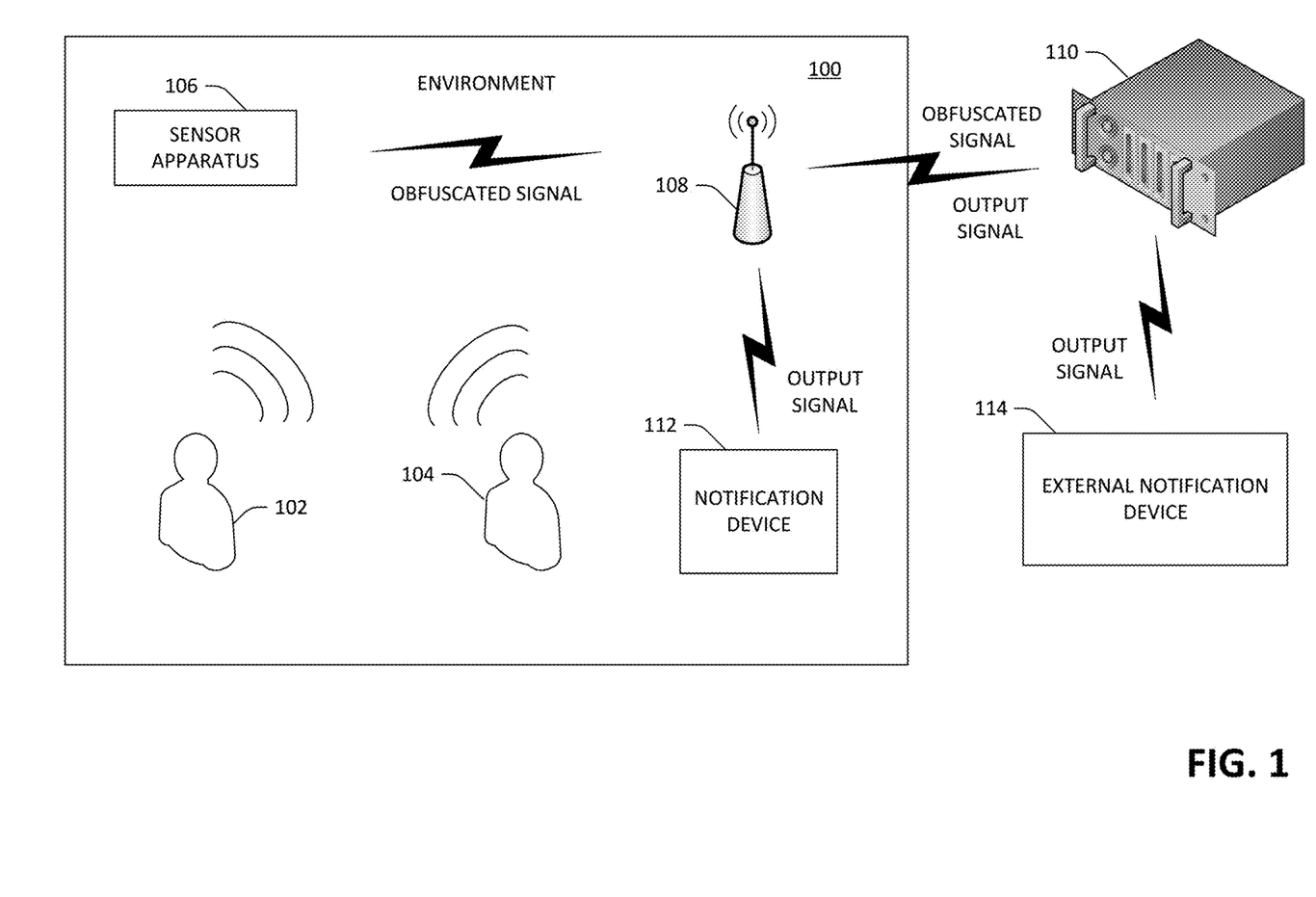
FIG. 1 illustrates an exemplary environment that includes a privacy preserving sensor apparatus.

With reference now to FIG. 1, an exemplary environment 100, where privacy of people therein is of concern, is illustrated. Accordingly, the environment 100 may be a room in a home, a home in general, a conference room, an office, a hospital room, or other areas where people perceive a right to privacy. In the environment 100, a first person 102 and a second person 104 are shown as conversing with one another. In the case where the environment 100 is a home, the first person 102 and the second person 104 can desire that their conversation and associated actions remain private (e.g., remain solely between the first person 102 and the second person 104). The environment 100 includes a privacy preserving sensor apparatus 106, which will be referred to herein as the sensor apparatus 106. Generally, the sensor apparatus 106 is configured to generate data that can be used to detect an occurrence of a desirably detected event in the environment 100, such as a child crying, a cry for help, a break-in to the environment 100, speaking of a particular word, performance of a particular gesture, etc. Operation of the sensor apparatus 106, however, desirably is not in contrast with notions of privacy held by the first person 102 and the second person 104.

As will be described in greater detail below, the sensor apparatus 106 can include a sensor, such as a video camera, a microphone, an inertial sensor, a light sensor, a thermometer, or the like, wherein the sensor can output a signal that is indicative of a parameter pertaining to the environment 100, such as an action being performed by the first person 102, a word spoken by the second person 104, etc. Thus, the signal can include content that the first person 102 and/or the second person 104 believes to be private. For purposes of explanation, the sensor in the sensor apparatus 106 is described as being a microphone; it is to be understood, however, that aspects described herein are not limited to a microphone.

The microphone in the sensor apparatus 106 is configured to output a signal that is indicative of audio in the environment, which can include a conversation between the first person 102 and the second person 104. The sensor apparatus 106 also includes circuitry that extracts features from the signal output by the microphone that can be used to detect an occurrence of the desirably detected event, but which cannot be used to reconstruct the original signal output by the microphone (or detect events that are not desired to be detected by the first person 102 and/or the second person 104). For instance, the features extracted from the signal output by the microphone can include insufficient information to allow semantics of a conversation to be understood (e.g., by a machine translation system), can include insufficient information to allow for an identity of a speaker to be ascertained (e.g., by a voice recognition system), etc. In an example, the desirably detected event may be a child crying; accordingly, a set of features can be extracted from the signal output by the microphone, wherein the set of features includes information that enables a computer-implemented detection system to detect that a child is crying, but the set of features includes insufficient information to enable a computer-implemented machine translation system to perform a semantic analysis over spoken words (for example). Features not extracted from the signal output by the microphone for the purposes of detecting the desirably detected event are immediately discarded.

In the exemplary environment 100, the sensor apparatus 106 can include a transceiver, and can transmit an obfuscated signal to a wireless access point 108. The obfuscated signal is based upon the signal output by the microphone, and comprises (potentially compressed and/or encoded) features extracted from the signal output by the microphone. While shown as being in the environment 100, it is to be understood that the wireless access point 108 can be external to the environment 100 (e.g., the wireless access point 108 can be a cellular antenna). The wireless access point 108 may then transmit the obfuscated signal to a computing device 110 that is configured to perform a cloud-based service, wherein the cloud-based service is detecting whether or not the desirably detected event has occurred based upon the obfuscated signal received from the access point 108. Continuing with the example set forth above, the computing device 110 can be configured to analyze the obfuscated signal and determine whether or not the child is crying based upon such analysis.

When the computing device 110 detects occurrence of the desirably detected event, the computing device 110, in an exemplary embodiment, can transmit an output signal to the access point 108 in the environment 100. The output signal can identify a particular notification device 112 in the environment 100 that is configured to notify a person (e.g., the first person 102 or the second person 104) when the desirably detected event has occurred. The wireless access point 108 may then transmit the output signal to the notification device 112, which can generate an output that notifies the person that occurrence of the desirably detected event has been detected. The notification device 112 may be or include an alarm, a computing device (such as a mobile telephone, a tablet (slate) computing device, a laptop computing device, a wearable computing device, etc.), a television, a game console, or other device that is configured to notify the person that the event has been detected. The first person 102 and/or the second person 104 receive the benefit by being notified of occurrence of the event, without the privacy concerns associated with conventional home sensors.

As shown, in another exemplary embodiment, the cloud service 110 can be configured to output the output signal to an external notification device 114. This embodiment may be particularly well-suited for situations where it is desirable to inform a person outside of the environment 100 of the occurrence of the event in the environment 100. For example, if the environment 100 is a home of an elderly and/or sickly person, the sensor apparatus 106 can be used in connection with detecting a fall and/or a call for help. The computing device 110 can detect such event based upon the obfuscated signal output by the sensor apparatus 106, and can transmit the output signal to the external notification device 114, which may be associated with a hospital, police, a remote caretaker, or the like.

In another exemplary embodiment, rather than transmitting the obfuscated signal to the computing device 110, the sensor apparatus 106 can transmit the signal to a computing device designated by the owner of the sensor apparatus 106, such as a computing device in the environment 100. Such computing device may be configured to detect occurrence of the desirably detected event based upon the obfuscated signal.

Applications in which the sensor apparatus 106 is particularly well-suited are now set forth. It is to be understood, however, that the exemplary applications set forth herein are not intended to be limiting, but are set forth to illustrate various advantages corresponding to the sensor apparatus 106. The sensor apparatus 106 can include a microphone that generates a signal that is indicative of audio in the environment 100. The sensor apparatus 106 can be included in or associated with a device that is configured to provide multimedia content to a person responsive to receiving voice commands from the person. The device can therefore be a television, a set top box, a streaming media device, a game console, etc. In this example, the desirably detected event is that the person has set forth a voice command, and the output signal causes content to be presented to the person, thereby notifying the person that the event has been detected.

The voice commands can be predefined, and circuitry in the sensor apparatus 106 can be configured to extract features from a signal output by the microphone in the sensor apparatus 106, wherein the computing device 110 can determine whether or not the person has set forth a spoken utterance based upon the extracted features. The features, however, cannot be used to reproduce the original signal output by the microphone, and may include insufficient information to identify the person that set forth the spoken utterance. In another example, the features extracted from the signal output by the microphone may include insufficient information to identify when the person has spoken words outside of the predefined set of voice commands. Accordingly, the person 102 and/or the person 104 can interact with the television, game console, and each other without fearing that the sensor apparatus 106 is retaining or transmitting the clear (not obfuscated) signal output by the microphone.

Further, the sensor apparatus 106 may be particularly well-suited for use in connection with home security. Thus, circuitry in the sensor apparatus 106 can be configured to extract features from a signal output by the microphone, wherein such features can be analyzed to determine whether or not the sound of a window breaking has occurred. The extracted features, however, in such an embodiment, include insufficient information to allow a machine translation system to reconstruct a privately held conversation between the first person 102 and the second person 104. In a similar application, the sensor apparatus 106 can be used in connection with remote patient monitoring, where it is desirable to detect occurrence of events such as falls, cries for help, or the like. As with the other applications, circuitry in the sensor apparatus 106 extracts features that include sufficient information to enable a computer-implemented detection system to detect occurrence of the desirably detected events, while the extracted features include insufficient information to allow for the original microphone signal to be reconstructed or a machine translation system to identify spoken words.

Figure 2:
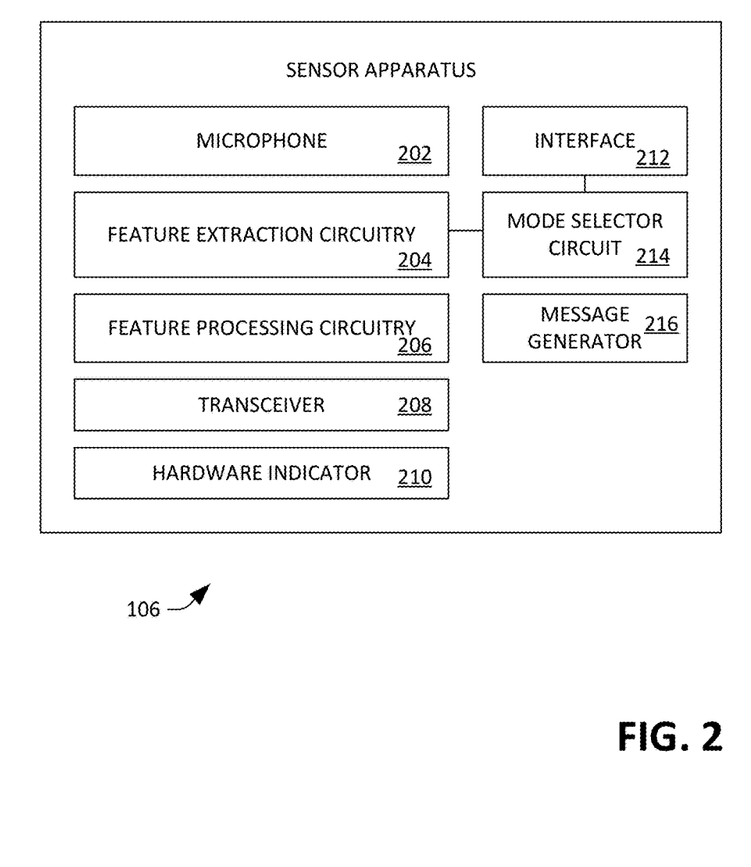
FIG. 2 illustrates an exemplary privacy preserving sensor apparatus.

Now referring to FIG. 2, a functional block diagram of the sensor apparatus 106 is illustrated. The sensor apparatus 106 includes a microphone 202 that is configured to detect acoustic vibrations in the environment 100 and output a signal that is representative of such vibrations. Pursuant to an example, the sensor apparatus 106 may be included in a tamper-resistant housing, which can be configured to damage the microphone 202 when subjected to tampering.

The sensor apparatus 106 additionally includes feature extraction circuitry 204 that receives the signal output by the microphone 202 and extracts certain features therefrom, wherein the features are usable by a computing device (e.g., the computing device) to detect a desirably detected event. The feature extraction circuitry 204 is tightly coupled with the microphone 202, wherein the tight coupling is undertaken to prevent a malicious hardware hacker from attempting to intercept or otherwise acquire the signal output by the microphone 202 prior to the signal being received by the feature extraction circuitry 204. Thus, the microphone 202 and the feature extraction circuitry 204 are integrated together in the sensor apparatus 106. In an exemplary embodiment, the microphone 202 and the feature extraction circuitry 204 can be co-located on a semiconductor chip. Thus, the microphone 202 may be a micro-electrical mechanical system (MEMS) microphone that is embedded in a silicon chip that includes the feature extraction circuitry 204. In such a configuration, a hardware hacker attempting to extract the signal output by the microphone 202 prior to such signal reaching the feature extraction circuitry 204 would likely extensively damage the sensor apparatus 106, rendering the microphone 202 unusable.

In an exemplary embodiment, the feature extraction circuitry 204 can be an Application Specific Integrated Circuit (ASIC) or other preconfigured circuit that is not reconfigurable after it has been fabricated. In such an embodiment, there is no software that can be hacked. Therefore, there is no fear that a malicious hacker will modify software to cause the feature extraction circuitry 204 to extract additional features or fail to discard desirably discarded features. In another exemplary embodiment, where an owner of the sensor apparatus 106 believes the benefits of configurability outweigh the risk of a software hack, the feature extraction circuitry 204 can be implemented in a field programmable gate array (FPGA), a general-purpose processor, or the like. The output of the feature extraction circuitry 204 can be the obfuscated signal. In another exemplary embodiment, cryptographic circuitry can be used to encrypt the features extracted by the feature extraction circuitry 204.

Moreover, in an exemplary embodiment, the feature extraction circuitry 204 can be configured to "fuzz" data in the signals in time, such that an entity that intercepts the signal will have difficulty decoding content of the signal based upon temporal patterns therein. In such an embodiment, the feature extraction circuitry 204 can be configured with information that is indicative of precision in time that is necessary for analyzing extracted features, and the feature extraction circuitry 204 can modify timing corresponding to extracted features to allow for event detection while "fuzzing" temporal characteristics of events encoded in the signal. In another example, the feature extraction circuitry 204 can encrypt extracted features, and assign time stamps to respective data packets. A recipient application can then decrypt the extracted features. In yet another example, a circuit or application that processes the extracted features can, from time to time, poll the sensor apparatus 106 for the extracted features. Other techniques are also contemplated for obfuscating features in time.

The sensor apparatus 106 further optionally includes feature processing circuitry 206 that can perform event detection (e.g., rather than the computing device 110 performing event detection) based upon features output by the feature extraction circuitry 204. In some embodiments, it may be desirable for event detection to occur locally at the sensor apparatus 106, such as when it is more economical to do so, when latency associated with a network is not acceptable for the application in which the sensor apparatus 206 is used, etc. Pursuant to an example, the feature processing circuitry 206 can be co-located on a silicon substrate with the feature extraction circuitry 204 and the microphone 202.

The sensor apparatus 106 also includes a transceiver 208 that can transmit the obfuscated signal output by the feature extraction circuitry 204 to the access point 108. The transceiver 208 may be configured as a Wi-Fi radio chip, a Bluetooth chip, an optical emitter that can emit optical signals, an acoustic emitter, or the like. When the sensor apparatus includes the feature processing circuitry 206, the transceiver 208 can be configured to transmit the output signal to the notification device 112 and/or the external notification device 114. The sensor apparatus 106 may also optionally include a hardware indicator 210 is in communication with the feature processing circuitry 206, wherein the hardware indicator 210 indicates that the feature processing circuitry 206 has detected occurrence of an event. For example, the hardware indicator 210 may be a light emitting diode (LED) that emits an optical signal when the feature processing circuitry 206 has detected occurrence of the event based upon the obfuscated signal output by the feature extraction circuitry 204. In another example, the hardware indicator 210 may be a speaker that outputs an audio signal when occurrence of the desirably detected event has been detected. In still yet another example, the hardware indicator 210 may cause the sensor apparatus 106 to vibrate.

In another exemplary embodiment, the sensor apparatus 106 can be a multi-modal sensor apparatus. While not shown, the feature extraction circuitry 204 may include multiple different feature extraction circuits, with each circuit corresponding to a respective different mode of operation of the sensor apparatus 106 (and a respective different desirably detected event). For instance, in a first mode of operation, the sensor apparatus 106 can be configured to facilitate detecting semantics of a conversation. In a second mode of operation, the sensor apparatus 106 can be configured to facilitate detecting when a particular person is speaking (e.g., identify a speaker). In a third mode of operation, the sensor apparatus 106 can be configured to facilitate detecting when a child leaves a "safety zone" in a home. Other modes are also contemplated, and the above are set forth merely as examples.

To allow the user to switch modes of operation of the sensor apparatus 106, the sensor apparatus 106 can optionally include an interface 212, which can be a button, a click wheel, a slider, etc. A user of the sensor apparatus 106 can select a desired mode of operation mode of the sensor apparatus 106 through interaction with the interface 212. An optionally included mode selector circuit 214 can select a feature extraction circuit in the feature extraction circuitry 204 based upon the interaction of the user with the interface 212 (e.g., the mode of operation selected by the user). For instance, the mode selector circuit 214 can direct the signal output by the microphone to the first feature extraction circuit when the first mode of operation is selected (while preventing other feature selection circuits from receiving such signal), can direct the signal to the second feature extraction circuit when the second mode of operation is selected (while preventing other feature selection circuits from receiving such signal), and so on.

In an example, the interface 212 may be a button, and a person can press such button to select the first mode of operation. The sensor apparatus is thus caused to generate an obfuscated signal that can be used by a machine translation system to detect semantics of human speech, but which includes insufficient information to enable a voice recognition system to detect an identity of the speaker or a computer-implemented detection system to detect the cry of the child. The user can subsequently again select the button, causing the mode of operation of the sensor apparatus 106 to change to the second mode. Therefore, it can be ascertained that the sensor apparatus 106 is multi-modal.

The sensor apparatus 106 may further optionally include a message generator 216 that can generate a message for provision to a computing device (for eventual consumption by a person). The message generator 216 can be in communication with the feature processing circuitry 206, and can receive an indication from the feature processing circuitry 206 that a particular event has been detected by the sensor apparatus 106. The message generator 216 can then generate a message that is to be transmitted to a computing device of a person who is to be notified of occurrence of an event. For instance, the message generator 216 can generate a text message, and the transceiver 208 can be configured to transmit the text message to a specified mobile device of the person. In another example, the message generator 216 can generate an email, a voice message, or other suitable notification.

Figure 3:
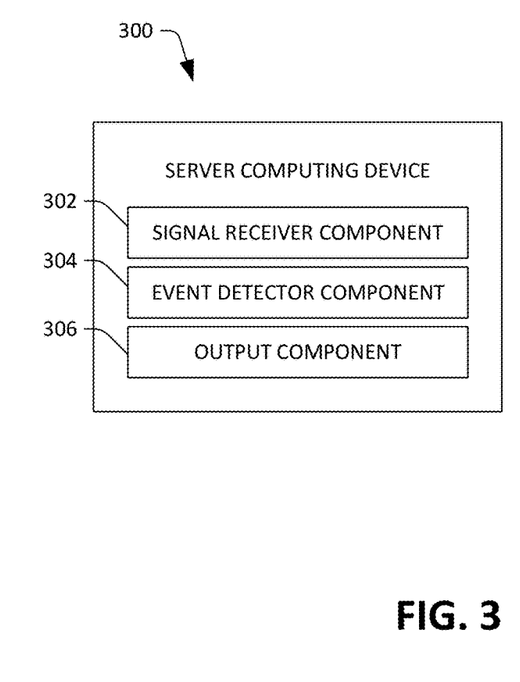
FIG. 3 illustrates an exemplary server computing device that can receive features from a privacy preserving sensor apparatus and detect an event based upon such features.

Referring now to FIG. 3, an exemplary computing device 300 that can be configured to detect occurrence of a desirably detected event based upon a received obfuscated signal output by the sensor apparatus 106 is illustrated. For example, the computing device 300 may be the computing device 110. In another example, the computing device 300 may be a computing device located in the environment 100 (e.g., a desktop computing device, a game console, a slate computing device, a wearable, etc.). The computing device 300 includes a signal receiver component 302 that receives an obfuscated signal output by the sensor apparatus 106 (e.g., directly or by way of the access point 108). The computing device 300 further includes an event detector component 304 that receives the obfuscated signal and is configured to ascertain whether or not a predefined event has occurred based upon the obfuscated signal. Exemplary events they can be detected by the event detector component 304 include, for example, whether or not an elderly person has fallen or needs help, whether a child stays in a particular area of a house, whether a burglar is attempting to break into a house, etc. Other exemplary events have been noted above. The computing device 300 further includes an output component 306 that can output a signal when the event detector component 304 detects that the event has occurred based upon the obfuscated signal received by the signal receiver component 302. For instance, the output component 306 can transmit the signal indicating that the event has occurred to the notification device 112 and/or the external notification device 114.

Figure 4:
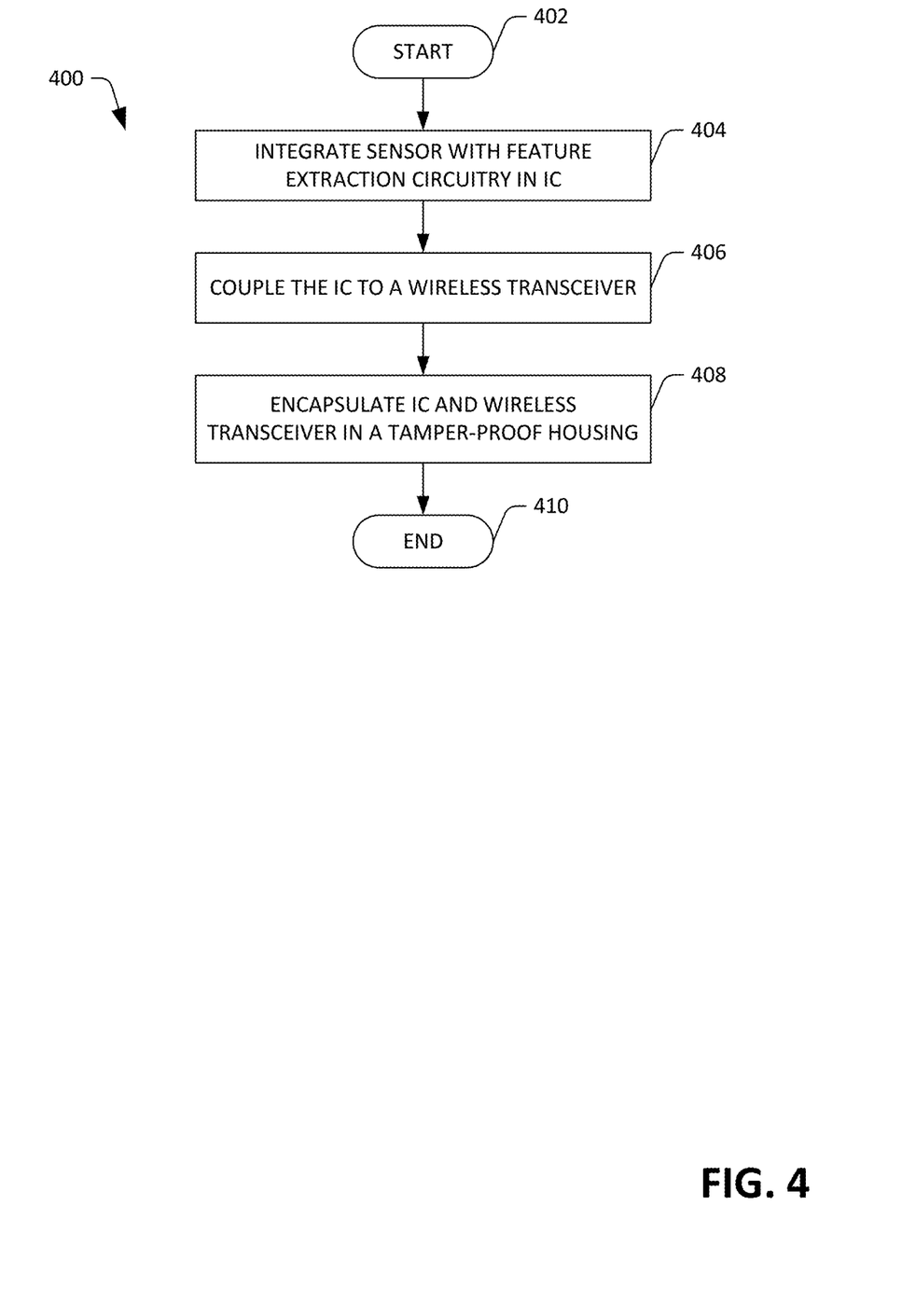
FIG. 4 is a flow diagram illustrating an exemplary methodology for constructing a privacy preserving sensor apparatus.
Figure 5:
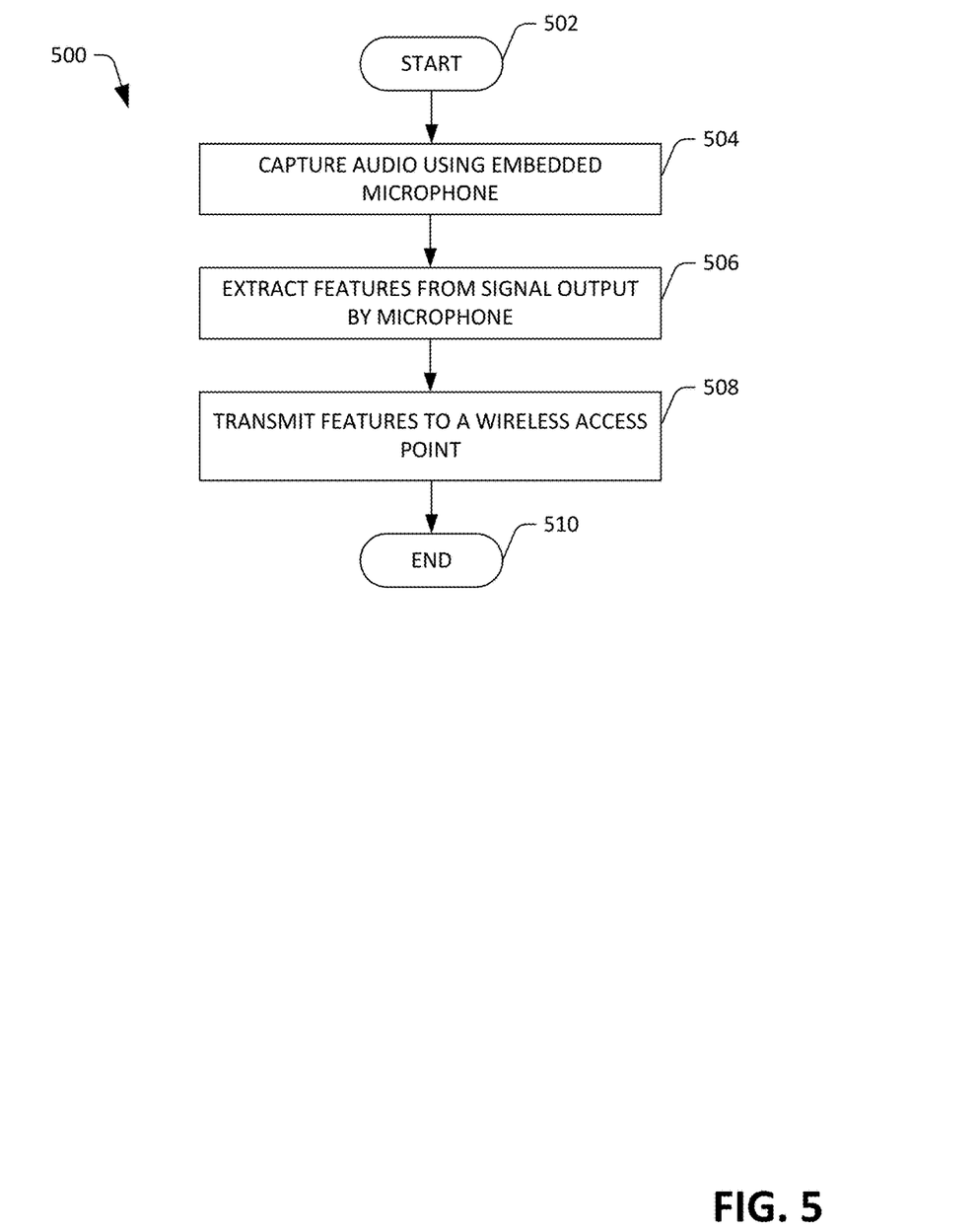
FIG. 5 is a flow diagram illustrating an exemplary methodology pertaining to operation of a privacy preserving sensor apparatus.

FIGS. 4-5 illustrate exemplary methodologies relating to construction and use of a privacy-preserving sensor. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 4, an exemplary methodology 400 that facilitates constructing a privacy preserving sensor apparatus is illustrated. The methodology 400 starts at 402, and at 404, a sensor is integrated with feature extraction circuitry. For instance, the sensor and the feature extraction circuitry can be included together in an integrated circuit (e.g., a single chip can include the sensor and the feature extraction circuitry). At 406, the integrated circuit is coupled to a wireless transceiver. In another exemplary embodiment, the wireless transceiver may also be included in the integrated circuit, such that it is integrated with the sensor and the feature extraction circuitry. At 408, the integrated circuit (and optionally the wireless transceiver) is encapsulated in a tamper-resistant housing. As noted above, the feature extraction circuitry is configured to extract a certain set of features from a sensor signal, wherein such features can be used to detect the event but cannot be used to reconstruct the original signal (thereby preserving privacy of people in a location in which the privacy preserving sensor is deployed). In an exemplary embodiment, features that can be extracted from the signal include features other than phase information (which is indicative of words in a spoken language). In another example, prosody features, such as pitch and sub-band energies, can be extracted from the signal output by the microphone, while the remainder of the signal is discarded. The methodology 400 completes at 410.

Turning now to FIG. 5, an exemplary methodology 500 that facilitates generation and transmittal of an obfuscated signal is illustrated. The obfuscated signal comprises features extracted from a signal output by a sensor, wherein the original signal output by the sensor is unable to be reconstructed through use of the obfuscated signal. The methodology 500 starts at 502, and at 504, audio is captured using, for example, a microphone that is embedded in silicon together with feature extraction circuitry. At 506, features are extracted from the signal output by the sensor. At 508, the features are transmitted to a wireless access point (e.g., the features form of an obfuscated signal). Subsequently, the obfuscated signal may be transmitted to a computing device used by a cloud service to detect occurrence of an event in the environment in which the privacy preserving sensor is deployed. The methodology 500 completes at 510.

Figure 6:
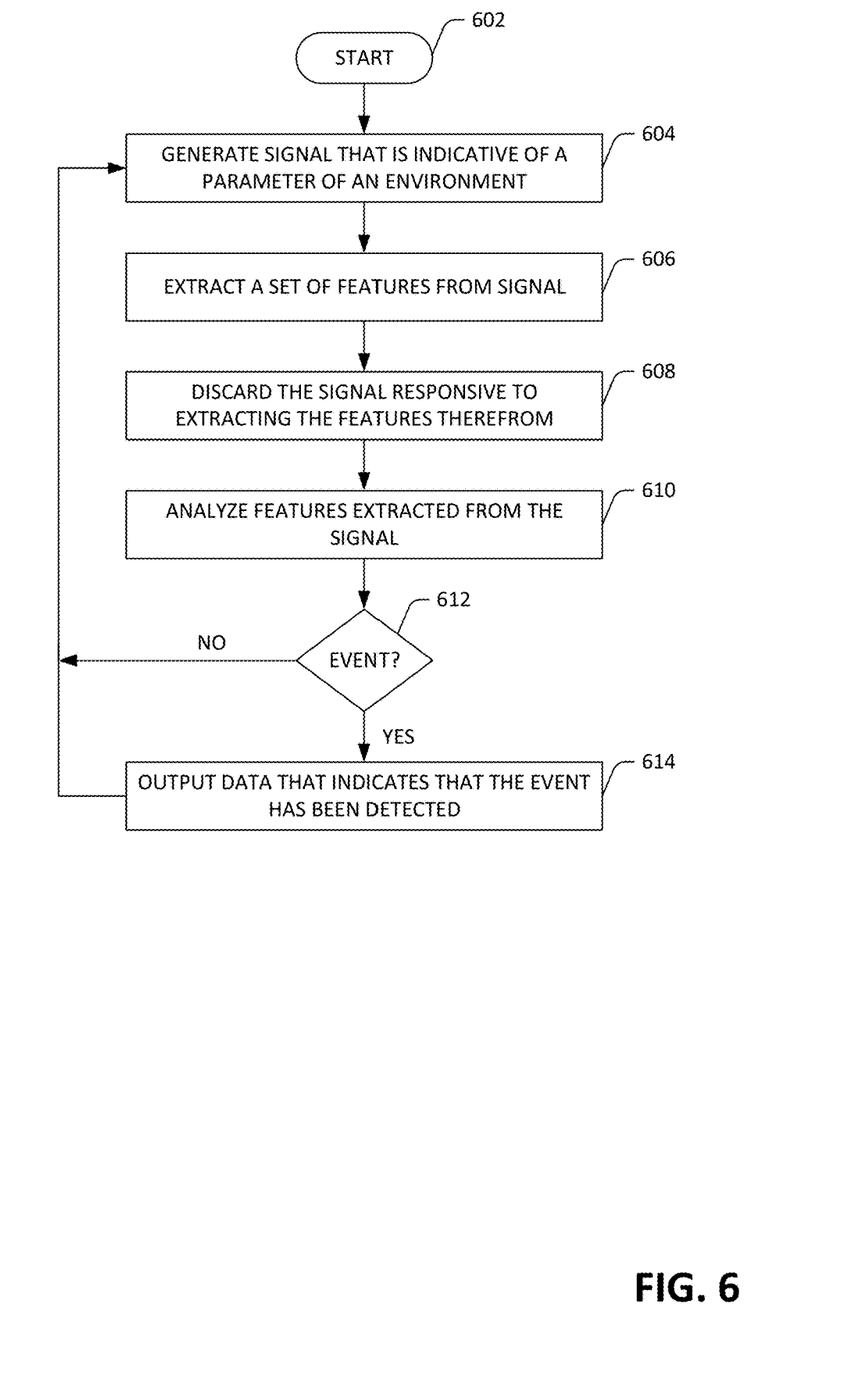
FIG. 6 is a flow diagram illustrating an exemplary methodology that can be performed by a privacy-preserving sensor apparatus.

With reference now to FIG. 6, an exemplary methodology 600 that can be performed by a privacy-preserving sensor apparatus is set forth. The methodology 600 starts at 602, and at 604 a sensor in the sensor apparatus generates a signal that is indicative of a parameter of an environment that includes the sensor apparatus. For instance, the signal can be a video signal (comprising multiple images), an audio signal, a temperature signal, etc.

At 606, a feature set is extracted from the signal generated by the sensor. As indicated above, the feature set can be used to detect an event, but cannot be used to reconstruct the above-mentioned signal. Further, the feature set can be used to detect the event, but can include insufficient information to allow for detection of desirably undetected events. Moreover, the circuitry used to extract the features can be tightly integrated with the sensor.

At 608, responsive to the feature set being extracted from the signal, the signal is discarded (such that only the feature set remains of the signal). For instance, the sensor apparatus can include a buffer, which can be used to retain one or more frames. Feature extraction circuitry can extract features from content of the buffer, and the buffer can then be updated with a most recent frame (or frames). Accordingly, a malicious hardware hacker is unable to retrieve or recreate the original signal by deconstructing the sensor apparatus.

At 610, the sensor apparatus is configured to analyze the features extracted at 608. For example, the sensor apparatus can include event detection circuitry that is configured to analyze the extracted features and determine whether an event (which the sensor apparatus is configured to detect) has occurred based upon the features. At 612, a determination is made regarding whether the event has been detected. When the event is not detected, the methodology 600 returns to 604. When the event is detected, at 614 data is output that indicates that the event has been detected. The data can be a signal transmitted to a computing device, an audio signal, a visual signal, or the like.

Figure 7:
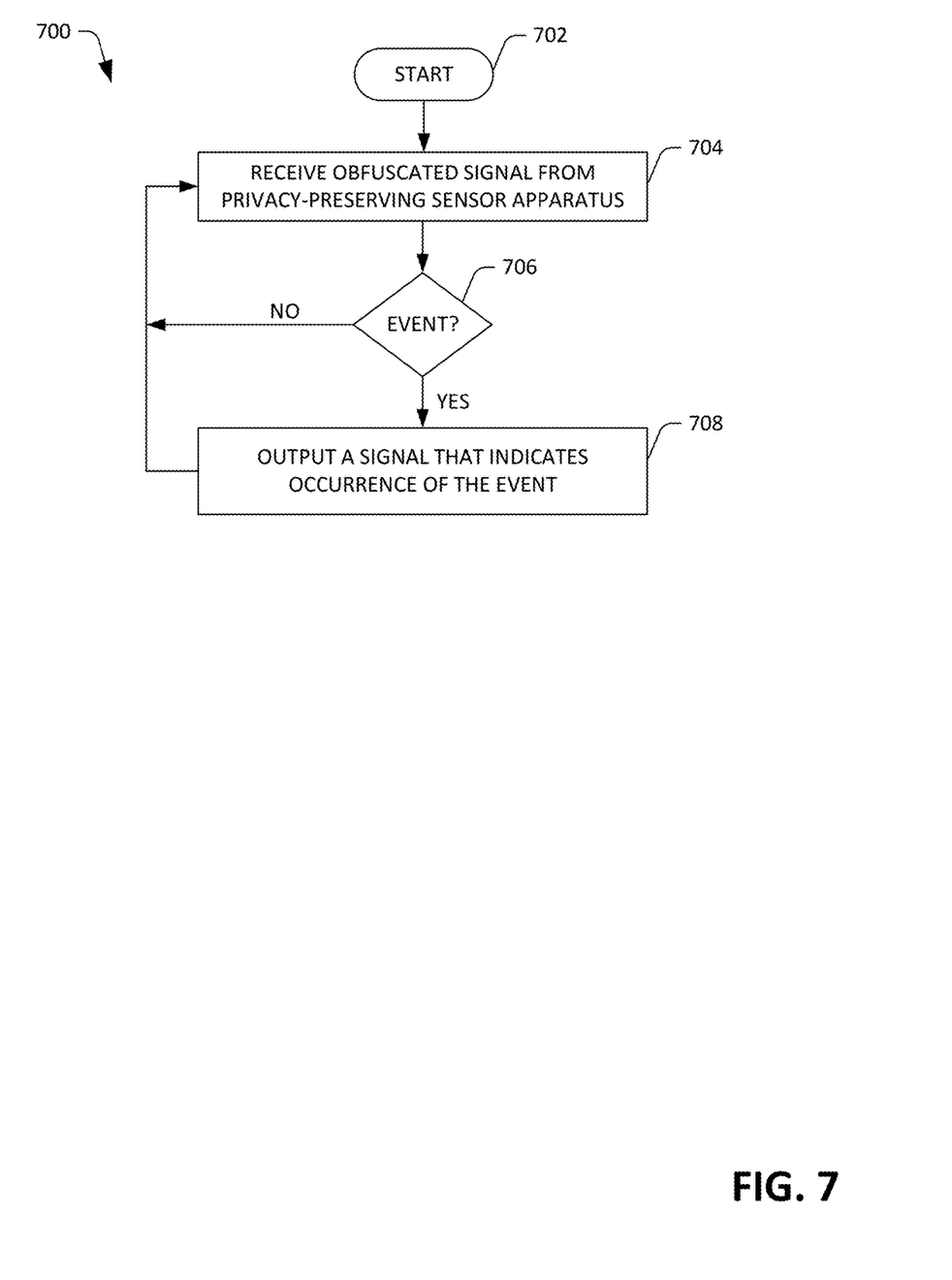
FIG. 7 is a flow diagram illustrating an exemplary methodology that can be performed by a computing device that is configured to detect an event based upon features extracted from a signal output by a sensor.

Referring now to FIG. 7, an exemplary methodology 700 that can be performed by a computing device that is configured to detect an event based upon features extracted from a signal output by a signal is illustrated. The methodology 700 starts at 702, and at 704 an obfuscated signal is received from a privacy-preserving sensor apparatus. As noted above, the obfuscated signal can comprise features extracted from sensor signal that can be used by the computing device to determine whether a particular type of event has occurred (e.g., child crying), while the features do not include enough information to allow for the computing device to determine whether a desirably undetected event has occurred (e.g., identifying a speaker). At 706, based upon the features in the obfuscated signal, a determination is made regarding whether the desirably detected event has occurred in the environment of the privacy preserving sensor apparatus. If it is determined that the event has not occurred, then the methodology 700 returns to 704. If it is determined at 706 that the event has occurred, then at 708 a signal is output that indicates that the event has occurred. The signal, for example, can be transmitted to notify a person of occurrence of the event, log the event in a data store (e.g., for future analysis), etc. In another example, media content can be presented to a user based upon the detection of the event (e.g., a voice command, gesture, . . . ).

Figure 8:
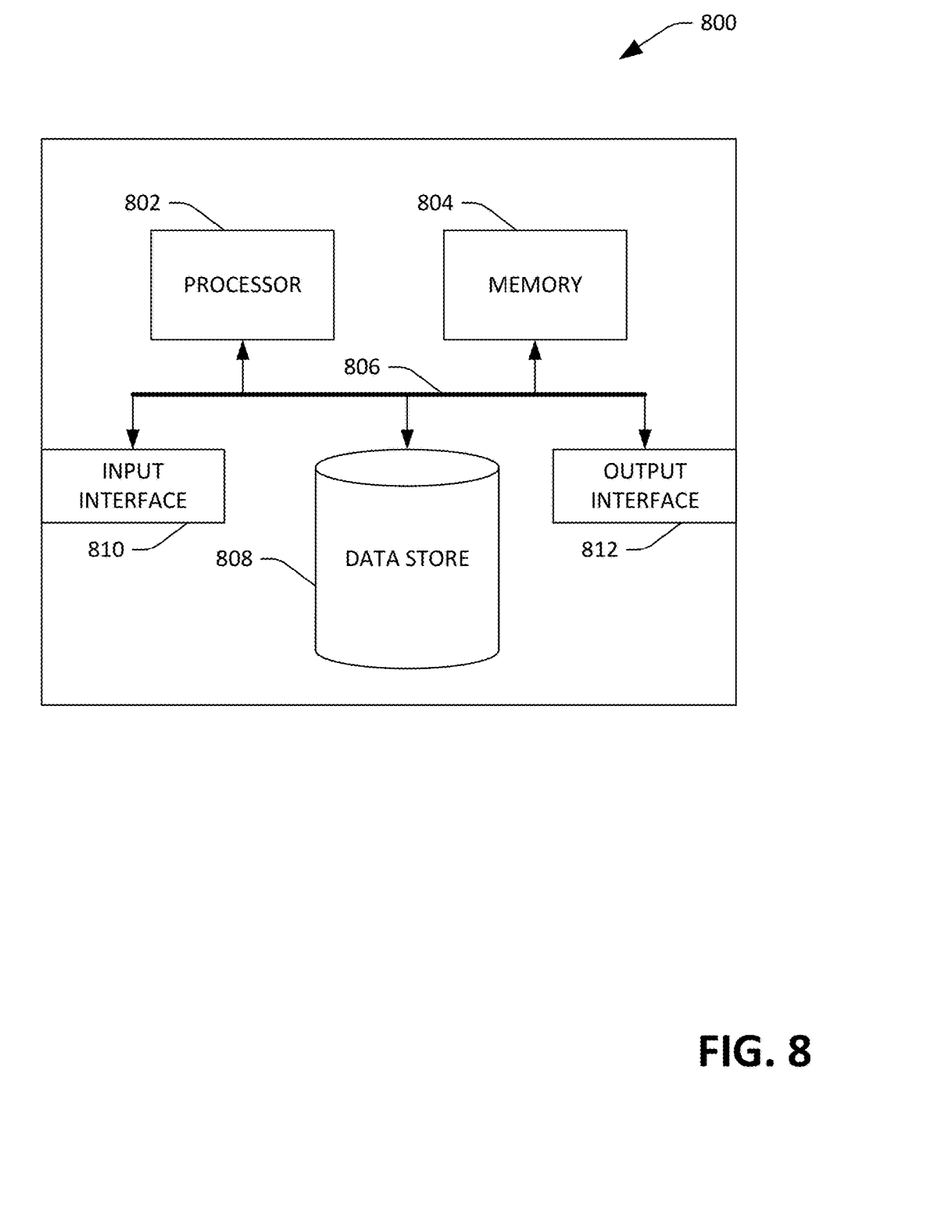
FIG. 8 is an exemplary computing device.

Referring now to FIG. 8, a high-level illustration of an exemplary computing device 800 that can be used in accordance with the systems and methodologies disclosed herein is illustrated. For instance, the computing device 800 may be used in a system that supports detecting occurrences of events, presenting multimedia content to a user, etc. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store features, multimedia content, etc.

The computing device 800 additionally includes a data store 808 that is accessible by the processor 802 by way of the system bus 806. The data store 808 may include executable instructions, features, multimedia content, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A privacy preserving sensor apparatus, comprising:
    a microphone that is configured to output a signal that is representative of a spoken utterance of a user; and
    feature extraction circuitry that is electrically coupled to the microphone, wherein the feature extraction circuitry is configured to extract a set of features from the signal, a voice recognition system is configured to use the set of features to recognize a first word in a predefined set of words when the first word is included in the spoken utterance, and the voice recognition system is not configured to use the set of features to recognize a second word that is outside the predefined set of words when the second word is included in the spoken utterance, wherein the feature extraction circuitry is configured to discard the signal immediately responsive to extracting the set of features from the signal, and further wherein neither the signal nor any features other than the set of features are provided to the voice recognition system.

2. The privacy preserving sensor apparatus of claim 1, wherein the microphone and the feature extraction circuitry are co-located on a semiconductor chip.

3. The privacy preserving sensor apparatus of claim 2, wherein the microphone is a micro electro-mechanical system microphone that is embedded in a silicon chip.

4. The privacy preserving sensor apparatus of claim 1, further comprising a wireless transceiver that is configured to transmit the set of features extracted by the feature extraction circuitry to a computing device that executes the voice recognition system.

5. The privacy preserving sensor apparatus of claim 1, wherein a computing system is unable to reconstruct the signal based solely upon the set of features.

6. The privacy preserving sensor apparatus of claim 1, further comprising a tamper-resistant housing that houses the microphone and the feature extraction circuitry.

7. The privacy preserving sensor apparatus of claim 1, wherein the feature extraction circuitry is a pre-configured application specific integrated circuit.

8. The privacy preserving sensor apparatus of claim 1, further comprising:
    second feature extraction circuitry that is configured to extract a second set of features from the signal output by the microphone, wherein only one of the feature extraction circuitry or the second feature extraction circuitry is electrically coupled to the microphone at any one point in time.

9. The privacy preserving sensor apparatus of claim 8, further comprising:
    a mode selector circuit that couples one of the feature extraction circuitry or the second feature extraction circuitry to the microphone and decouples the other of the feature extraction circuitry or the second feature extraction circuitry from the microphone.

10. The privacy preserving sensor apparatus of claim 1, further comprising the voice recognition system.

11. A method performed at a privacy preserving sensor apparatus, the method comprising:
    generating, by a microphone, a signal that is representative of a spoken utterance of a user;
    extracting first features from the signal, the first features are configured for use by a voice recognition system to recognize that the spoken utterance includes a first word in a predefined set of words, the first features are not configured for use by the voice recognition system to recognize that the spoken utterance includes a second word that is outside the predefined set of words;
providing the first features to the voice recognition system responsive to extracting the first features from the signal, wherein the privacy preserving sensor apparatus refrains from providing the voice recognition system with either the signal or second features that are configured for use by the voice recognition system to recognize that the spoken utterance includes the second word; and
discarding the signal immediately responsive to extracting the first features from the signal.

12. The method of claim 11, wherein the privacy preserving sensor apparatus comprises the voice recognition system, the method further comprising:
recognizing that the spoken utterance of the user includes the first word based upon the first features extracted from the signal.

13. The method of claim 11, wherein providing the first features to the voice recognition system comprises transmitting a second signal to an access point, wherein the second signal comprises data that is indicative of the first features, and further wherein the access point is in network communication with a computing device that executes the voice recognition system.

14. The method of claim 13, further comprising:
prior to transmitting the second signal, encrypting the first features, wherein the second signal includes the encrypted first features.

15. A privacy preserving sensor apparatus, comprising:
a microphone;
a processor; and
memory that stores instructions that, when executed by the processor, cause the processor to perform acts comprising:
extracting a set of features from a signal output by the microphone, wherein the signal is representative of a spoken utterance of a user, wherein a voice recognition system is configured to use the set of features to recognize a first word in a predefined set of words when the first word is included in the spoken utterance, and further wherein the voice recognition system is not configured to use the set of features to recognize a second word outside the predefined set of words when the second word is included in the spoken utterance; and
discarding the signal immediately responsive to extracting the set of features from the signal, wherein the voice recognition system is prevented from receiving the signal or any features other than those in the set of features, and further wherein the signal is unable to be reconstructed based solely upon the set of features.

16. The privacy preserving sensor apparatus of claim 15, the acts further comprising recognizing that the spoken utterance includes the first word based upon the set of features extracted from the signal.

17. The privacy preserving sensor apparatus of claim 15, the acts further comprising causing the set of features to be transmitted to a computing device that executes the voice recognition system.

18. The privacy preserving sensor apparatus of claim 15, wherein the voice recognition system is configured to use the set of features to recognize a plurality of words when the plurality of words are included in the spoken utterance, wherein the first word is included in the plurality of words.

19. The privacy preserving sensor apparatus of claim 15, further comprising a tamper-resistant housing that houses the microphone, the processor, and the memory.

* * * * *